Patented June 4, 1946

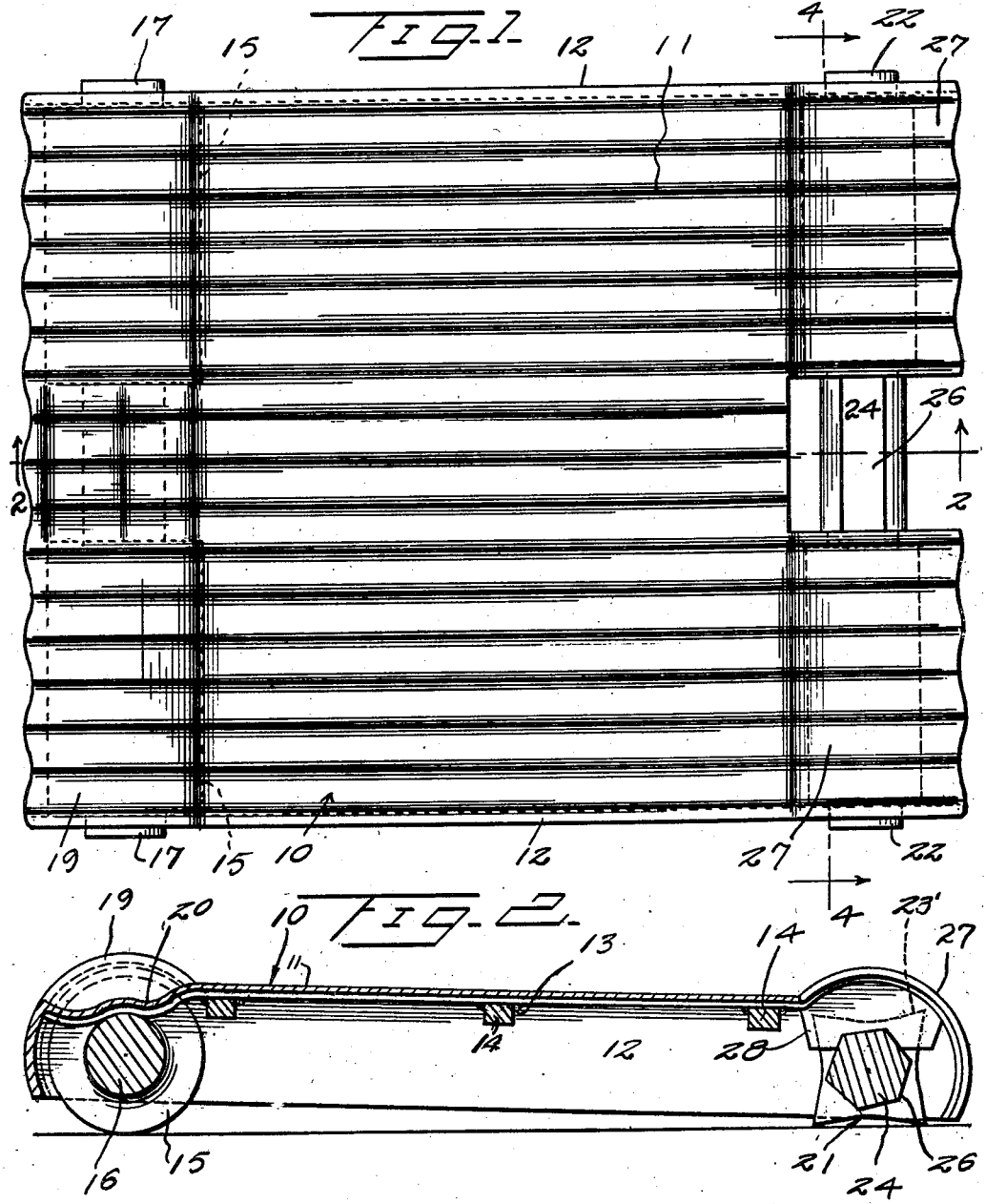

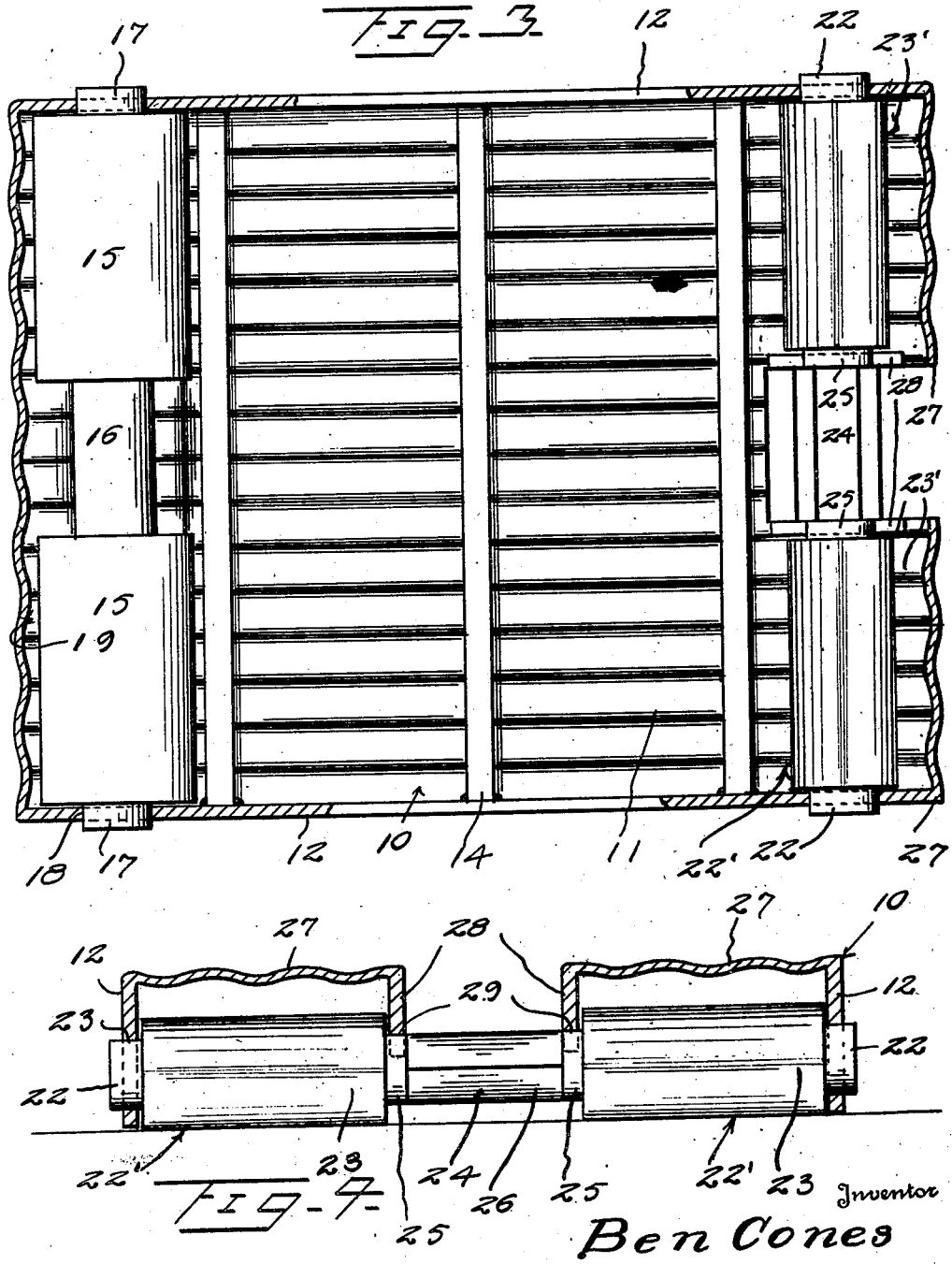

2,401,295

UNITED STATES PATENT OFFICE 2,401,295

SIDE CREEPER

Ben Cones, Indianapolis, Ind.

Application April 12, 1944, Serial No. 530,639

2 Claims. (Cl. 280—3)

This invention relates to an inexpensive yet highly efficient means for moving automobiles, other vehicles or objects.

It is aimed to provide a structure which will support a jack while engaged beneath an automobile to enable the latter to be moved sidewise through the medium of a wrench or the equivalent, being especially useful in jacking up an automobile close to a curb and spacing it from the curb to provide ample room for tire changing or other operations, and also for moving the car or vehicle sidewise out of snowdrifts or sand, where traction may be had.

The more specific objects and advantages will become apparent from a consideration of the description following taken in connection with accompanying drawings illustrating an operative embodiment.

In said drawings—

Figure 1 is a plan view of the creeper;

Figure 2 is a vertical section taken on the line 2—2 of Figure 1;

Figure 3 is an inverted plan view; and

Figure 4 is a vertical section taken on the line 4—4 of Figure 1.

Referring specifically to the drawings wherein like reference characters designate like or similar parts, it is to be understood that the device may be built in any desired size and of any desired material according to the strength necessary for use in connection with automobiles, other vehicles or any contemplated object. The creeper has a body generally designated 10 which is preferably made from any suitable gauge sheet metal and preferably provided by a die punch operation. The metal or material of this body is preferably corrugated for greater strength as shown.

Such body has a comparatively flat platform at 11 which may support a bumper jack or other jack which is engaged with an automobile, other vehicle or object.

Body 10 has integral depending side walls at 12. Between the side walls 12 and welded or otherwise secured thereto and to the platform 11 as at 13, are brace bars 14.

At one end a pair of case hardened rolls 15 are provided to travel on the ground. These rolls preferably being integral and connected at 16 and having axle members or trunnions 17 which are journaled in suitable bearing openings 18 provided in the side walls 12. It will be noted that the body 10 is arched as at 19 to provide a fender about the rollers 15 and that such arch is preferably centrally depressed as at 20.

At 21 I provide a novel actuating element and ground-engaging brake holding the device against moving when this feature is in ground rested position, with two of its points resting upon the ground. This element has trunnions 22 suitably journaled in openings 23 in the walls 12. It also includes a pair of ribbed or toothed members 22', each having any desired number of ribs or teeth as at 23', for direct engagement with the ground-supporting surface. The members 22' are joined by an integral connector 24 preferably having round journals at 25 and a hexagonal or other non-circular portion 26 therebetween.

Above the members 22', the body 10 is arched as at 27 to provide fenders about the members 22' and the inner portions of such fenders 27 extend downwardly to provide bearing walls 28 having arcuate portions 29 in their under surface affording bearings which engage the journals 25.

In using the structure, any suitable jack or the equivalent may be supported on the platform 11 and used to jack up an automobile, other vehicles or other object or part thereof, and it will be realized that when the object is thus supported, the creeper is adapted to be shifted laterally or in any direction to thus position the object for operation, as to move it from a curb. In moving the creeper, a standard end wrench is applied to the connector 24 in order to turn it and cause the teeth 23 to successively bite into the ground or supporting surface and thus impart movement to the creeper.

It is to be understood that the creeper is not limited to any particular use or in any particular location and in addition to being used in connection with automobiles and other vehicles, it may for instance be used inside of freight cars or on bodies of trucks. In addition to being useful in moving automobiles away from curbs as in facilitating tire changing operations, such a movement is also advantageous in overcoming snowdrifts or sand, to place the creeper on a road bed where traction may be obtained.

Various changes may be resorted to provided they fall within the spirit and scope of the invention.

I claim as my invention:

1. A creeper of the character described comprising a body provided with a supporting roller at one end thereof and a brake supporting the opposite end of the body, said brake consisting of a rotary element provided with outstanding pointed structures for ground engagement, said body being constructed of sheet material, said body being provided with sidewalls and being corrugated for its entire length to prevent flexing of the body when supporting a load.

2. A creeper of the character described comprising a body provided with a supporting roller at one end thereof and a brake supporting the opposite end of the body, said brake consisting of a rotary element, provided with outstanding pointed structures for ground engagement, said body being constructed of sheet material, said body being provided with sidewalls and being corrugated for its entire length to prevent flexing of the body when supporting a load, said platform having its inflexions curved upwardly and downwardly to define fenders for said roller and brake, the corrugations of the body extending through said fenders.

BEN CONES.